(12) United States Patent
Burns et al.

(10) Patent No.: US 11,094,024 B2
(45) Date of Patent: Aug. 17, 2021

(54) ADDRESS BASED PARAMETER ESTIMATION

(71) Applicant: Opendoor Labs Inc., San Francisco, CA (US)

(72) Inventors: Simon Burns, San Francisco, CA (US); Wenyang Dong, Dublin, CA (US); Jonathan E. Chu, San Francisco, CA (US); Mamta Bhandari, San Francisco, CA (US); Charles Clayton Allsopp, San Francisco, CA (US)

(73) Assignee: Opendoor Labs Inc., San Francisco, CA (US)

(*) Notice: Subject to any disclaimer, the term of this patent is extended or adjusted under 35 U.S.C. 154(b) by 280 days.

(21) Appl. No.: 16/177,110

(22) Filed: Oct. 31, 2018

(65) Prior Publication Data
US 2020/0134756 A1    Apr. 30, 2020

(51) Int. Cl.
  *G06Q 50/16*   (2012.01)
  *G06Q 40/02*   (2012.01)
  *G06F 16/29*   (2019.01)

(52) U.S. Cl.
  CPC ......... *G06Q 50/167* (2013.01); *G06Q 40/025* (2013.01); *G06F 16/29* (2019.01)

(58) Field of Classification Search
  CPC ..... G06Q 50/167; G06Q 40/025; G06F 16/29
  See application file for complete search history.

(56) References Cited

U.S. PATENT DOCUMENTS

| | | | |
|---|---|---|---|
| 2002/0035520 A1* | 3/2002 | Weiss ................... | G06Q 40/025 705/26.62 |
| 2008/0140494 A1* | 6/2008 | Charuk .............. | G06Q 30/0641 705/313 |
| 2011/0131121 A1* | 6/2011 | Hagman ................ | G06Q 40/02 705/35 |
| 2016/0042452 A1* | 2/2016 | Giudilli .................. | G06Q 40/04 705/36 R |
| 2017/0228842 A1* | 8/2017 | Fenn .................... | G06Q 50/188 |

* cited by examiner

*Primary Examiner* — Florian M Zeender
*Assistant Examiner* — Christopher R Buchanan
(74) *Attorney, Agent, or Firm* — Schwegman Lundberg & Woessner, P.A

(57) ABSTRACT

Systems and methods are disclosed for receiving, from a client device, a first input that provides a current address associated with a user; receiving, from the client device, a second user input that identifies a target location; and searching a real-estate database to identify a real-estate property associated with the current address. The systems and methods further provide for estimating equity associated with the real-estate property, updating parameters of a loan model based on the target location and the estimated equity, and providing an output of the model for presentation to the user based on the updated parameters.

19 Claims, 9 Drawing Sheets

| Offer Price | Market/Location | |
|---|---|---|
| $ 30000 | Phoenix, AZ | |
| Cost | Traditional | You Select |
| Average days to close | 90 | |
| Agent commissions/OD Risk | 6.00 % | 7.5 % |
| Title and escrow fees | 0.50 % | 0 % |
| Average seller concessions | 3.00 % | 0 % |
| Typical home repairs & clean up | 0.5 % | 0.5 % |
| Estimated carrying costs | 1.50 % | 0 % |
| Months renting | 4 | 0 |
| Estimated rental costs | $ 6000 | $ 0 |
| Total cash | $ 259,500 | $ 276,000 |
| Mortgage remaining | $ 0 | $ 0 |
| Net proceeds | $259,500 | $276,000 |

FIG. 7

ADDRESS BASED PARAMETER ESTIMATION

BACKGROUND

Real-estate property transactions are typically performed using various types of financial instruments or loans known as mortgages. Buyers who desire to purchase a given property need to assess how much a mortgage will cost in order to accurately determine whether the buyer can afford the property. The cost of a mortgage depends on various parameters, including the amount of down payment, the current interest rate, the type of loan product, real-estate taxes, homeowners association fees, and so forth. Although tools exist for determining the cost of given mortgage, the accuracy of the tools is dependent on the inputs a given user provides. Users spend a great deal of time manually researching, computing, and determining the correct inputs to provide to the mortgage tools and, even then, some values are incorrectly determined.

BRIEF DESCRIPTION OF THE DRAWINGS

Various ones of the appended drawings merely illustrate example embodiments of the present disclosure and should not be considered as limiting its scope.

FIGS. 6-7 are illustrative user interfaces for providing an output of the loan model, according to some example embodiments.

DETAILED DESCRIPTION

Figure 1:
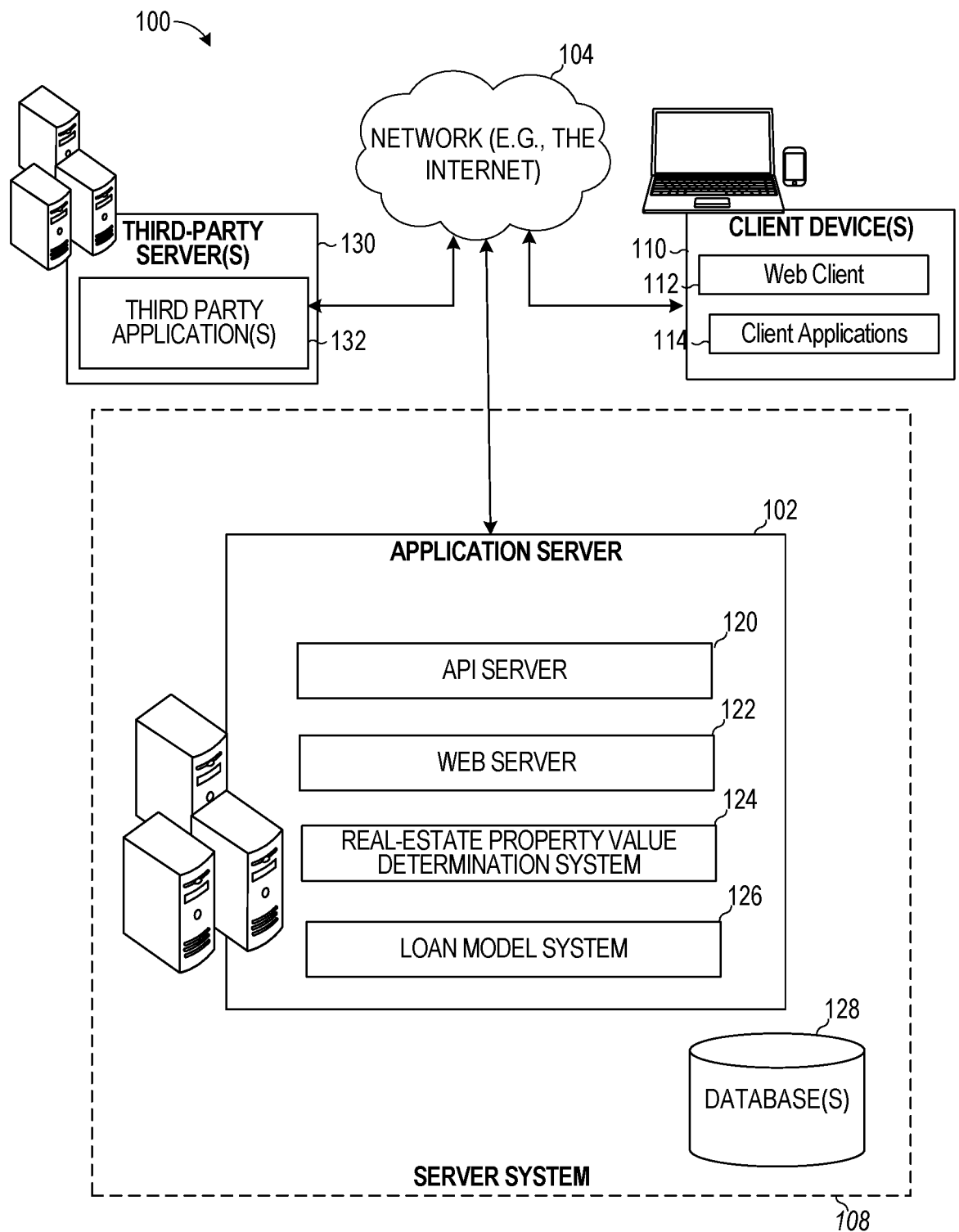
FIG. 1 is a block diagram illustrating a networked system, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Accurately determining cost of a mortgage is key to performing real-estate transactions. For example, a buyer who is considering purchasing a given real-estate property typically needs to determine how much the mortgage will cost (e.g., on a monthly basis) before visiting the site of the property or making an offer to purchase the property. Determining the cost of the mortgage ahead of time ensures that after purchasing the property, the buyer will have sufficient resources to pay their monthly expenses in addition to the mortgage. Inaccurately determining the cost of the mortgage can have catastrophic consequences. For example, a buyer who underestimates the cost of the mortgage may waste time visiting a property the buyer cannot afford or, even worse, can make an offer and enter into an agreement to purchase the property. The same buyer who enters into the purchase agreement with the seller and later discovers the buyer underestimated the mortgage cost may end up paying a significant amount of damages to the seller for terminating the agreement.

The tools available for determining the cost of the mortgage can automate determining some mortgage parameters (e.g., tax information and current interest rates) but not others (e.g., down payment information and mortgage amount). For example, existing tools can automatically determine the current interest rates and property taxes at a specific location but require the user to input the down payment, homeowners association fees, homeowners insurance, and home price of the property the buyer is interested in purchasing. The down payment is the money the buyer pays upfront for a new home. The interest rate for the property typically varies based on a number of factors: home price, down payment, credit score, and location. The home insurance or homeowners insurance is an annual cost for obtaining a mortgage and varies based on location. The homeowners association fees (HOA) are the dues that cover shared costs like maintenance and upkeep of common areas and apply to condominiums and townhomes and sometimes apply to single family homes that have shared amenities.

Buyers typically visit multiple properties per week and need to determine these specific mortgage parameters for each property they visit. In addition, determining each of these specific mortgage parameters is typically not trivial and consumes a great deal of time researching to find the right numbers. The amount of time required to determine the accurate mortgage parameters can discourage various buyers from computing the mortgage cost.

The disclosed embodiments improve the efficiency and accuracy of other mortgage estimation systems by automatically estimating parameters of a mortgage (e.g., using a loan model) to compute the mortgage cost and output the information to a user. The automatic estimation of the parameters allows the disclosed embodiments to accurately estimate mortgage cost for a given property with minimal user input (e.g., without the user having to manually input various mortgage parameters). This significantly reduces the amount of research and time a user needs to spend computing various mortgage parameters and increases the overall accuracy of the mortgage cost computation. This provides buyers with a more accurate value of how much they can afford and avoids potential catastrophic consequences resulting from underestimating the cost of a mortgage.

According to some embodiments, inputs are received from the user specifying a current home address of the user and a target location (e.g., a zip code, city and state, or complete address) where the user intends to purchase a real-estate property. Based on this information, the system, according to the disclosed embodiments, automatically estimates the down payment for the mortgage based on an automatically determined estimate of equity the user has in a real-estate property the user owns at the current home address the user inputs. In addition, the system, according to the disclosed embodiments, automatically determines the homeowners association fees, home insurance, and home price of the property at the target location by accessing a database that contains averages or statistically computed values representing the home owners association fees, home insurance, and home price of the property at the target location. The system obtains these automatically determined values (e.g., the down payment, homeowners association fees, home insurance, and home price of the property at the target location) and other mortgage parameters (e.g., current interest rate and loan product) and automatically computes and outputs the cost of the mortgage.

FIG. 1 is a block diagram illustrating a networked system 100, according to some example embodiments, configured to automatically determine mortgage cost and provide the value to an interested entity (e.g., a user). The system 100 includes one or more client devices such as client device 110. The client device 110 comprises, but is not limited to, a mobile phone, desktop computer, laptop, portable digital assistants (PDA), smart phone, tablet, ultrabook, netbook, laptop, multi-processor system, microprocessor-based or programmable consumer electronic, game console, set-top box, computer in a vehicle, or any other communication device that a user may utilize to access the networked system 100. In some embodiments, the client device 110 comprises a display module (not shown) to display information (e.g., in the form of user interfaces). In further embodiments, the client device 110 comprises one or more of touch screens, accelerometers, gyroscopes, cameras, microphones, global positioning system (GPS) devices, and so forth. The client device 110 may be a device of a user that is used to access and utilize home buying services (e.g., obtain mortgage cost information). For example, the client device 110 may be used to input information to request an automated offer on a subject real-estate property, to request a value of a subject real-estate property, to request mortgage cost information, to request affordability information (e.g., how much a user can afford to spend on a given real-estate property), to make an offer on a subject real-estate property, to receive and display various information about a subject real-estate property or a market, and so forth.

For example, client device 110 is a device of a given user who would like to sell his or her subject real-estate property. Client device 110 accesses a website of the home buying and selling service (e.g., hosted by server system 108). The user inputs an address of the subject real-estate property and selects an option to receive an automated offer or value of the subject real-estate property in the website. Server system 108 receives the request and identifies comps (e.g., a plurality of real-estate properties) having similar attributes as the subject real-estate property. Server system 108 automatically retrieves characteristics of the subject real-estate property based on the address and search for comps within a predetermined distance (e.g., 1.2 miles) of the address of the subject real-estate property. Server system 108 then automatically computes a value for the subject real-estate property and provides the value to the client device 110 instantly or after a period of time (e.g., 24 hours). In some circumstances, server system 108 involves an operator of a website of the home buying and selling service using an operator device to review the value that was automatically computed before the value is returned to the client device 110. Client device 110 receives the value and provides an option to the user to complete the real-estate transaction. For example, the user selects an option to complete the sale of the real-estate property. In response, server system 108 automatically generates a contract for sale of the subject real-estate property and allows the user to execute the contract to complete the sale. After the user executes the contract the subject real-estate property enters a pending status. Server system 108 may present a list of available closing dates to the user. Once the user selects the closing date, the subject real-estate property closes at the contract price on the closing date.

As another example, client device 110 is a device of a given user who would like to obtain mortgage cost information. Client device 110 accesses a website of the home buying and selling service (e.g., hosted by server system 108). The user inputs an address of the real-estate property the user owns, identifies a target location of the property the user is interested in purchasing, and, optionally, selects a type of loan product (e.g., 30-year fixed or 15-year fixed mortgage) on the website. Server system 108 receives the user inputs and automatically estimates how much equity the user has in the property at the address of the real-estate property the user owns to automatically determine the down payment parameter of the mortgage. Server system 108 also retrieves various other mortgage parameters specific to the target location (e.g., average real-estate property values, average cost of insurance, average taxes, average homeowners association fees, etc.) and a current interest rate of a selected loan product. Server system 108 inputs the automatically determined mortgage parameters into a loan model to compute an estimated mortgage cost (e.g., the monthly cost of the mortgage). For example, the loan model may compute the mortgage cost in accordance with Equation 1:

$$A = P \frac{r(1+r)^n}{(1+r)^n - 1}$$

where
A=payment Amount per period
P=initial Principal (loan amount)
r=interest rate per period
n=total number of payments or periods
Equation 1:
Specifically, server system 108 computes the initial principal amount P by computing a difference between the average real-estate property values at the target location and the down payment. Server system 108 computes the interest rate per period r based on the current interest rate of the selected mortgage. Server system 108 computes the total monthly cost of the mortgage based on a sum of the payment amount per period A and the home owners insurance fees (e.g., average insurance parameter), and property tax (e.g., a property tax parameter) and homeowners association fees (e.g., a homeowners association fees parameter). The total monthly cost is then provided by server system 108 to the client device 110.

One or more users may be a person, a machine, or other means of interacting with the client device 110. In example embodiments, the user may not be part of the system 100, but may interact with the system 100 via the client device 110 or other means. For instance, the user may provide input (e.g., touch screen input or alphanumeric input) to the client device 110 and the input may be communicated to other entities in the system 100 (e.g., third-party servers 130, server system 108, etc.) via the network 104. In this instance, the other entities in the system 100, in response to receiving the input from the user, may communicate information to the client device 110 via the network 104 to be presented to the user. In this way, the user interacts with the various entities in the system 100 using the client device 110.

The system 100 further includes a network 104. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The client device 110 may access the various data and applications provided by other entities in the system 100 via web client 112 (e.g., a browser, such as the Internet Explorer® browser developed by Microsoft® Corporation of Redmond, Wash. State) or one or more client applications 114. The client device 110 may include one or more client applications 114 (also referred to as "apps") such as, but not limited to, a web browser, messaging application, electronic mail (email) application, an e-commerce site application, a mapping or location application, an online home buying and selling application, a real estate application, and the like.

In some embodiments, one or more client applications 114 are included in a given one of the client device 110, and configured to locally provide the user interface and at least some of the functionalities, with the client application 114 configured to communicate with other entities in the system 100 (e.g., third-party servers 130, server system 108, etc.), on an as-needed basis, for data and/or processing capabilities not locally available (e.g., to access location information, to access market information related to homes, to authenticate a user, to verify a method of payment, etc.). Conversely, one or more applications 114 may not be included in the client device 110, and then the client device 110 may use its web browser to access the one or more applications hosted on other entities in the system 100 (e.g., third-party servers 130, server system 108, etc.).

A server system 108 provides server-side functionality via the network 104 (e.g., the Internet or wide area network (WAN)) to one or more third-party servers 130 and/or one or more client devices 110. The server system 108 includes an application program interface (API) server 120, a web server 122, a real-estate property value determination system 124, and a loan model system 126, that may be communicatively coupled with one or more databases 128. The one or more databases 128 may be storage devices that store data related to users of the system 108, applications associated with the system 108, cloud services, housing market data, and so forth. The one or more databases 128 may further store information related to third-party servers 130, third-party applications 132, client devices 110, client applications 114, users, and so forth. In one example, the one or more databases 128 may be cloud-based storage.

The server system 108 may be a cloud computing environment, according to some example embodiments. The server system 108, and any servers associated with the server system 108, may be associated with a cloud-based application, in one example embodiment.

The server system 108 includes a real-estate property value determination system 124. Real-estate property value determination system 124 may include one or more servers and may be associated with a cloud-based application. Real-estate property value determination system 124 may obtain real-estate property information representing activity information associated with a plurality of real-estate properties from databases 128. Real-estate property value determination system 124 determines a value of a subject real-estate property input by a user of client device 110 and returns the value to the client device 110. Real-estate property value determination system 124 estimates equity a given user has in a given real-estate property at a current address provided by the user. Real-estate property value determination system 124 determines average real-estate property values, average cost of insurance, average taxes, average homeowners association fees associated with a given target location where a user is interested in purchasing real-estate property. The user of client device 110 may be an interested entity that desires to determine a mortgage cost for purchasing a given property. The details of real-estate property value determination system 124 are provided below in connection with FIG. 2.

The server system 108 includes a loan model system 126. Loan model system 126 obtains various automatically determined mortgage parameters of a current address (e.g., down payment information) and a target location (e.g., average real-estate property values, average cost of insurance (e.g., average insurance parameter), average taxes, average homeowners association fees associated with the target location). Loan model system 126 applies a model to the mortgage parameters and computes an estimated mortgage cost based on a selected mortgage model. The details of loan model system 126 are provided below in connection with FIG. 3.

The system 100 further includes one or more third-party servers 130. The one or more third-party servers 130 may include one or more third-party application(s) 132. The one or more third-party application(s) 132, executing on third-party server(s) 130, may interact with the server system 108 via API server 120 via a programmatic interface provided by the API server 120. For example, one or more the third-party applications 132 may request and utilize information from the server system 108 via the API server 120 to support one or more features or functions on a website hosted by the third party or an application hosted by the third party. The third-party website or application 132, for example, may provide software version analysis functionality that is supported by relevant functionality and data in the server system 108.

Third-party servers 130 may include a multiple listing service (MLS) server. This service is publicly accessible to real-estate brokers nationwide. A real-estate broker inputs property information to the MLS server (e.g., price information and property attributes) to list the property for sale. Other brokers can access the MLS server to search and filter properties available for sale or that have been sold and select a given property to view. The MLS server may allow a real-estate broker to provide an offer to purchase a given property being listed for sale on behalf of a buyer. The MLS server may indicate whether a given property listing is pending indicating that an executed purchase and sale agreement between a buyer and seller of the real-estate property has been received. Typically, the real-estate property closes or sells about 70 days following the receipt of the signed agreement to purchase the real-estate property.

The MLS server may include a database of real-estate properties. Characteristics of each property stored in the MLS server may also be provided. Characteristics include a location of the property, a school district, a tax rate, a home owners association rate, interior conditions (e.g., whether the property has been renovated, whether the property has stainless steel appliances, whether the property has a pool, whether the property has granite countertops), whether the property is characterized as new construction, whether the property has previously been occupied, and so forth. The information of the MLS server may be included as part of database 128. The MLS real-estate properties information may be used to search for comps to automatically determine a value of a subject real-estate property.

Figure 2:
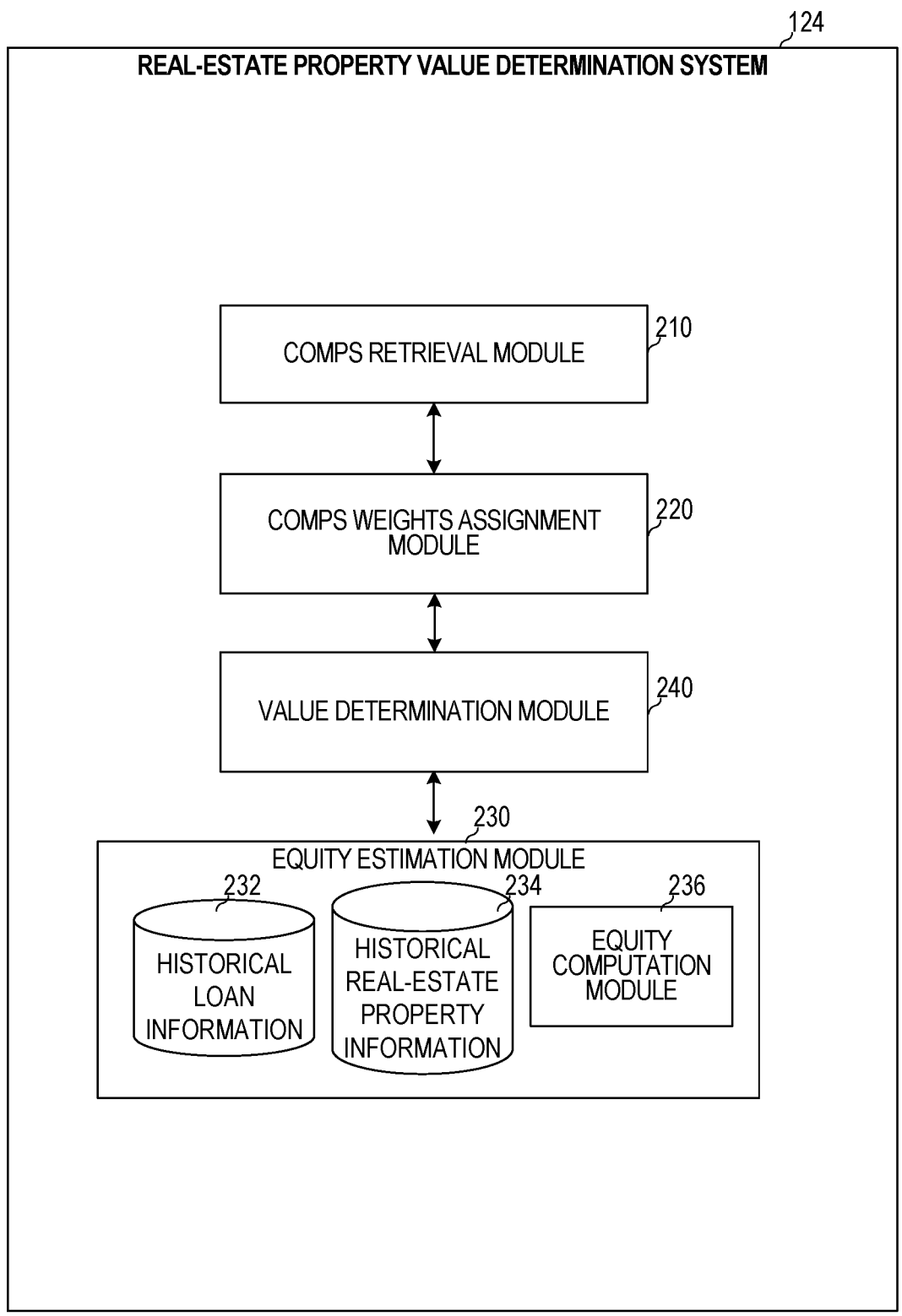
FIG. 2 illustrates a real-estate property value determination system, according to some example embodiments.

FIG. 2 illustrates a real-estate property value determination system 124, according to some example embodiments. Real-estate property value determination system 124 includes a comps retrieval module 210, a comps weights assignment module 220, a value determination module 240, and an equity estimation module 230.

Comps retrieval module 210 receives an input address of a subject real-estate property from a client device 110 and identifies one or more real-estate property comps. Comps retrieval module 210 may search for any real-estate property that is within a given distance (e.g., 1.2 miles) of the address of the subject real-estate property. The search may be performed on the MLS server by accessing database 128. Comps retrieval module 210 may limit the search on the MLS server based on one or more parameters. The parameters may include status of the comps (e.g., closed, active, or pending), sale time interval (e.g., within the past 2 years), and sale price range (e.g., within $50 k of the average sale price of real-estate properties in the 1.2 mile radius). In this way, comps retrieval module 210 may identify all of the real-estate properties that are active, closed, or pending, that are within 1.2 miles of the subject real-estate property, that have had activity within the past two years, and are within a certain sale price range.

After these real-estate properties have been identified in the MLS server as matching the parameters, the comps retrieval module 210 may rank the number of comps based on similarity to the subject real-estate property. For example, comps retrieval module 210 may access database 128 (or request further input from client device 110) to retrieve one or more characteristics of the subject real-estate property. Specifically, the comps retrieval module 210 may determine a location of the property, a school district, a tax rate, a home owners association rate, interior conditions (e.g., whether the property has been renovated, whether the property has stainless steel appliances, whether the property has a pool, whether the property has granite countertops), whether the property is characterized as new construction, whether the property has previously been occupied, and so forth. Comps retrieval module 210 may also retrieve the same corresponding characteristics of the real-estate properties that have been identified in the MLS server as matching the parameters. Comps retrieval module 210 may rank the real-estate properties that have been identified in the MLS server as matching the parameters based on how many of the characteristics of the real-estate properties have been identified in the MLS server as matching the parameters of the subject real-estate property. In certain embodiments, comps retrieval module 210 may select the top twenty real-estate properties in the ranked list as the identified real-estate properties for use in determining a value of the subject real-estate property.

After generating the ranked list of comps, comps retrieval module 210 adjusts a sale price of each comp in the ranked list. Specifically, comps retrieval module 210 adjusts a sale price of each comp to reflect a price of the comp were the characteristics of the comp more similar to the characteristics of the subject real-estate property. For example, if the subject real-estate property has a pool and a comp does not, sale price of the comp is increased. Similarly, if the subject real-estate property has not been renovated and a comp has been renovated, the sale price of the comp is decreased. The output of the comps retrieval module 210 is a ranked list of a predetermined number (e.g., twenty) real-estate property sales that have their sale prices adjusted based on characteristics of the subject real-estate property. This output is provided to the comps weights assignment module 220.

The comps weights assignment module 220 may assign different weights to each adjusted sale price provided by comps retrieval module 210. For example, comps weights assignment module 220 assigns weights to each adjusted sale price based on one or more characteristics of the corresponding comp real-estate property. Specifically, if the subject real-estate property has a pool, a higher weight may be assigned to an adjusted sale price corresponding to a comp that has a pool than an adjusted sale price corresponding to a comp that does not have a pool. In some implementations, higher weight values may be assigned to adjusted sale prices of comps that are more similar (e.g., are ranked higher in the list) to the subject real-estate property.

The weighted adjusted sale prices are output from comps weights assignment module 220 to value determination module 240. Value determination module 240 may include a model for automatically determining subject real-estate values. In some implementations, value determination module 240 computes a weighted average of the weighted adjusted sale prices. The weighted average may be provided as the determined value of the subject real-estate property. In some embodiments, this automatically determined value is returned to the client device 110 as the value of the subject real-estate transaction without further operator review or involvement. In some embodiments, the automatically determined value is used to generate an automatic offer for the purchase of the subject real-estate property. In some embodiments, value determination module 240 takes 24 hours or longer to compute an estimate of the value of a given real-estate property. In such circumstance, the client device 110 which requested an offer on a given real-estate property (e.g., a property a user intends to purchase or a property the user currently owns) may be notified (e.g., by text message or email) when the offer based on the value determined by value determination module 240 is ready after the 24 hour period. The notification may include mortgage cost information determined based on the determined value.

Equity estimation module 230 includes a historical loan information storage 232, a historical real-estate property information storage 234, and an equity computation module 236. In some embodiments, real-estate property value determination system 124 estimates a user's equity in a given property associated with a current home address of the user. For example, as part of the inputs the user provides to receive the automatically determined mortgage cost, the user provides the user's current home address. Real-estate property value determination system 124 searches the MLS server to identify a real-estate property associated with the user's current home address.

Equity estimation module 230 estimates how much equity (e.g., how much of the property's value is owned or belongs to the user in comparison to how much of the property's value is owned by the financial institution by way of a mortgage). To estimate the equity associated with a given real-estate property, equity estimation module 230 accesses a historical real-estate property information storage 234 to identify the last purchase price associated with the real-estate property associated with the user's current home address. Historical real-estate property information storage 234 associates different real-estate properties at various addresses with their last sale price. Historical real-estate property information storage 234 associates different geographical regions (e.g., zip codes) with average insurance policy costs (e.g., insurance parameter) at different time periods (e.g., monthly, daily, yearly, or other suitable time period). For example, historical real-estate property information storage 234 stores, for each zip code, a list of different average insurance policy costs each associated with a different time period. Historical real-estate property information storage 234 associates different geographical regions (e.g., zip codes) with average appreciation values at different time periods (e.g., monthly, daily, yearly, or other suitable time period). For example, historical real-estate property information storage 234 stores, for each zip code, the average appreciation value associated with different time periods. The average appreciation value indicates a percentage increase or decrease in the property value during a given time interval. For example, if a given property was valued at $200,000 at one time point and the appreciation value is 3% one year later from the time point, the new value of the property one year later from the time point is $206,000 (e.g., $200,000+3%*$200,000).

In some embodiments, historical real-estate property information storage 234 stores the property taxes associated with different geographical locations (e.g., states). An illustrative table stored by historical real-estate property information storage 234 is provided below:

| State | Mean Effective Property Tax |
|---|---|
| Alabama | 0.40% |
| Alaska | 1.01% |
| Arizona | 0.66% |
| Arkansas | 0.64% |
| California | 0.73% |
| Colorado | 0.59% |
| Connecticut | 1.53% |
| Delaware | 0.55% |
| D.C. | 0.54% |
| Florida | 0.98% |
| Georgia | 0.91% |
| Hawaii | 0.28% |
| Idaho | 0.73% |
| Illinois | 1.98% |
| Indiana | 0.86% |
| Iowa | 1.42% |
| Kansas | 1.30% |
| Kentucky | 0.80% |
| Louisiana | 0.50% |
| Maine | 1.20% |
| Maryland | 1.00% |
| Massachusetts | 1.11% |
| Michigan | 1.46% |
| Minnesota | 1.09% |
| Mississippi | 0.65% |
| Missouri | 1.00% |
| Montana | 0.75% |
| Nebraska | 1.65% |
| Nevada | 0.71% |
| New Hampshire | 1.99% |
| New Jersey | 2.11% |
| New Mexico | 0.66% |
| New York | 1.38% |
| North Carolina | 0.84% |
| North Dakota | 0.95% |
| Ohio | 1.58% |
| Oklahoma | 0.85% |
| Oregon | 1.01% |
| Pennsylvania | 1.46% |
| Rhode Island | 1.46% |
| South Carolina | 0.55% |
| South Dakota | 1.22% |
| Tennessee | 0.75% |
| Texas (6) | 1.67% |
| Utah | 0.63% |
| Vermont | 1.70% |
| Virginia | 0.81% |
| Washington | 0.94% |
| West Virginia | 0.53% |
| Wisconsin | 1.74% |
| Wyoming | 0.51% |

In some embodiments, historical real-estate property information storage 234 stores the home insurance premiums associated with different geographical locations (e.g., states). An illustrative table stored by historical real-estate property information storage 234 is provided below:

| | Annual Home Insurance Premiums | Percentage (Based on $220k home) |
|---|---|---|
| Alabama | $1,340 | 0.536% |
| Alaska | $976 | 0.444% |
| Arizona | $765 | 0.348% |
| Arkansas | $1,252 | 0.569% |
| California | $974 | 0.443% |
| Colorado | $1,273 | 0.579% |
| Connecticut | $1,337 | 0.608% |
| Delaware | $736 | 0.335% |
| D.C. | $1451 | 0.523% |
| Florida | $2,055 | 0.934% |
| Georgia | $1,089 | 0.495% |
| Hawaii | $1,018 | 0.463% |
| Idaho | $590 | 0.268% |
| Illinois | $987 | 0.449% |
| Indiana | $944 | 0.429% |
| Kansas | $1,431 | 0.650% |
| Kentucky | $1,023 | 0.465% |
| Louisiana | $1,847 | 0.840% |
| Maine | $811 | 0.369% |
| Maryland | $942 | 0.428% |
| Massachusetts | $1,314 | 0.597% |
| Michigan | $865 | 0.393% |
| Minnesota | $1,219 | 0.554% |
| Mississippi | $1,447 | 0.658% |
| Missouri | $1,199 | 0.545% |
| Montana | $1,003 | 0.456% |
| Nebraska | $1,226 | 0.557% |
| Nevada | $704 | 0.320% |
| New Hampshire | $905 | 0.411% |
| New Jersey | $1,092 | 0.496% |
| New Mexico | $937 | 0.426% |
| New York | $1,256 | 0.571% |
| North Carolina | $1,056 | 0.480% |
| North Dakota | $1,136 | 0.516% |
| Ohio | $797 | 0.362% |
| Oklahoma | $1,772 | 0.805% |
| Oregon | $574 | 0.261% |
| Pennsylvania | $893 | 0.406% |
| Rhode island | $1,398 | 0.635% |
| South Carolina | $1,240 | 0.564% |
| North Dakota | $995 | 0.452% |
| Tennessee | $1,139 | 0.518% |
| Texas | $1,947 | 0.885% |
| Utah | $634 | 0.288% |
| Vermont | $844 | 0.384% |
| Virginia | $946 | 0.430% |
| Washington | $695 | 0.316% |
| West Virginia | $877 | 0.399% |
| Wisconsin | $686 | 0.312% |
| Wyoming | $1,021 | 0.464% |

In some embodiments, historical real-estate property information storage 234 is stored on the MLS server and equity estimation module 230 obtains this information from the MLS server. The last purchase price is the total amount paid (e.g., down payment plus mortgage) for the given real-estate property. The equity estimation module 230 also retrieves the last sale date associated with the last sale price indicating the date the last transaction for the sale of the property took place. This information indicates when the given user requesting the mortgage cost purchased the user's current home and how much the given user paid in total for that home.

Using the last sale date, equity estimation module 230 accesses historical loan information storage 232 to identify the average interest rate (e.g., average borrowing parameter of a loan) for loans at the location (e.g., city and state) of the given real-estate property on the last sale date. Specifically, historical loan information storage 232 associates various interest rates for various geographical regions at different points in time. In some implementations, historical loan information storage 232 stores the different interest rates on a monthly basis, a daily basis, hourly basis, or other suitable time interval. For example, historical loan information storage 232 stores a list of cities and states and, for each city and state, associates a list of different loan interest rates associated with different time periods and different loan products. Equity estimation module 230 generates historical loan information storage 232 by retrieving interest rates, on the specified time interval (e.g., monthly), from various financial institutions and computing an average of the interest rates for different loan products at different cities and states. Historical loan information storage 232 stores the computed average of the interest rates for different cities and states and the date at which the interest rates were retrieved in association with each city and state. Historical loan information storage 232 in some implementations is a database hosted by a financial institution and is publicly accessible. In some implementations, historical loan information storage 232 stores the different down payment amounts in percentage terms for different cities. For example, historical loan information storage 232 stores a list of cities and states and, for each city and state, associates a list of average down payment amounts associated with different time periods.

Equity computation module 236 retrieves from the historical real-estate property information storage 234, for the real-estate property at the user's current address, the last sale price, the date of the last sale price, the average insurance cost, the appreciation values for each year from the date of the last sale price until the present date. Equity computation module 236 retrieves from the historical loan information the average interest rate at the user's current address (e.g., the city and state of the user's current address) associated with the date of the last sale price and the average down payment amount (e.g., 20%) associated with the date of the last sale price (e.g., the last sale date). Equity computation module 236 computes the user's equity in the real-estate property at the current address as a function of the average of the appreciation values and the last sale price of the real-estate property offset by the cost of the mortgage. For example, equity computation module 236 computes the user's equity in accordance with Equation 2 below:

$$Equity = (Pi + Av*Pi) - ((100-Dv)*Pi) + Mp \qquad \text{Equation 2}$$

where Av is an average of all the retrieved appreciation values for each year since the last sale date, Pi is the last sale price, Dv is the average down payment amount in percentage terms on the last sale date, and Mp is the mortgage paid to date amount, which is a function of the amount of time from the last sale date to the present date and the average interest rate at the user's current address associated with the date of the last sale price and any average insurance amount on the last sale date.

In some implementations, equity estimation module 230 computes how much equity the user has in the property at the user's current address based on a current value of the property determined by value determination module 240 using information obtained from comps retrieval module 210 and comps weights assignment module 220. Equity estimation module 230 computes a difference of the current value of the real-estate property provided by value determination module 240 and the last sale price of the property. This amount is decremented by the amount remaining on the mortgage (e.g., the difference of the current value of the real-estate property and the last sale price of the property is offset by ((100–Dv)*Pi)+Mp) of Equation 2). Equity estimation module 230 provides the computed equity amount to loan model system 126 for use as the automatically computed down payment parameter of the mortgage.

Figure 3:
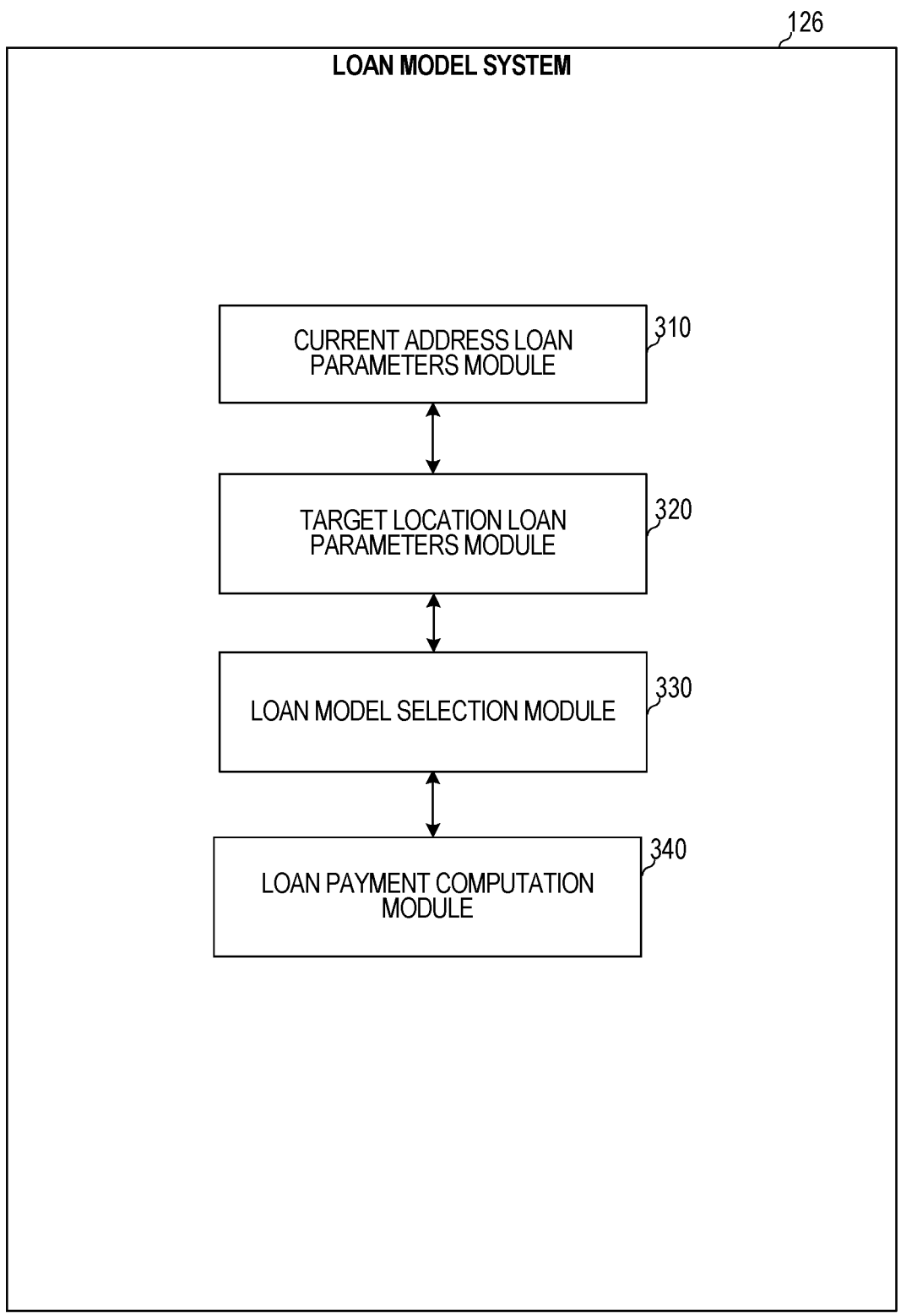
FIG. 3 illustrates a loan model system, according to some example embodiments.

FIG. 3 illustrates a loan model system 126, according to some example embodiments. Loan model system 126 includes a current address loan parameters module 310, a target location loan parameters module 320, a loan model selection module 330, and a loan payment computation module 340. Loan model system 126 is configured to communicate with real-estate property value determination system 124 to obtain a current value of a given real-estate property (e.g., a current value of a property the user currently owns at the user's current address and a current value or average of values of properties at a target location where the user is interested in purchasing property). Loan model system 126 is configured to communicate with real-estate property value determination system 124 to obtain equity information associated with the real-estate property the user owns at the user's current address the user inputs.

Current address loan parameters module 310 communicates with equity estimation module 230 to obtain estimated equity information associated with a property the user owns at a currently input address. In some implementations, current address loan parameters module 310 receives from a client device 110 a current address of the user's home. Current address loan parameters module 310 provides the input address to the equity estimation module 230 for computing an estimate of the user's equity in a home at the input address. Current address loan parameters module 310 receives the equity information and applies this equity value as the down payment parameter of a loan. In some embodiments, current address loan parameters module 310 applies only a portion (e.g., 75%) of the received equity value to the down payment parameter.

Target location loan parameters module 320 communicates with real-estate property value determination system 124 to obtain various loan parameters associated with a target location. In some implementations, target location loan parameters module 320 receives from a client device 110 a target location (e.g., zip code, city and state, and/or specific property address) where the user is interested in purchasing property. Target location loan parameters module 320, where a specific address of a property is received from the client device 110, receives from value determination module 240 an estimated value of real-estate property at the target location. In some embodiments, where a zip code or city and state is received from the client device 110, target loan parameters module 320 accesses historical real-estate property information storage 234 or an MLS server database to obtain loan-specific parameters of the location (e.g., average real-estate property values, average real-estate property taxes, average mortgage insurance amounts, average HOA fees, average interest rates, etc.).

Loan model selection module 330 selects a loan product (e.g., 30 year fixed interest, 15 year fixed interest, 5/1 adjustable interest, etc.). Different loan products have different intervals and/or different interest rates associated with them. In some embodiments, loan model selection module 330 automatically selects a 30 year fixed interest loan product. In some embodiments, loan model selection module 330 receives from a client device 110 a selection of a specific loan product. The selected loan product is provided to loan payment computation module 340.

Loan payment computation module 340 computes automatically an estimate of a monthly cost of a particular type of loan selected by loan model selection module 330. Specifically, loan payment computation module 340 generates an output of the loan model that is selected, the generated output indicating a monthly cost of the selected loan model based on the monthly real-estate costs (e.g., property taxes and insurance costs) and various other loan parameters (e.g., interest rate, type of loan, length of the loan, and amount of the loan). In some embodiments, loan payment computation module 340 computes the estimate of the monthly cost in accordance with Equation 1. Specifically, loan payment computation module 340 implements a loan model that is a function that has a number of mortgage parameters and that outputs a monthly cost for the particular loan. The loan model function updates and computes various parameters of Equation 1 and also includes a number of other property costs (e.g., taxes and insurance) in a total value representing the monthly cost of the loan. For example, loan payment computation module 340 computes the initial principal amount P by computing a difference between the average real-estate property values at the target location received from target location loan parameters module 320 and the down payment received from current address loan parameters module 310. Server system 108 computes the interest rate per period r based on the current interest rate of the selected mortgage and the type of loan product selected by loan model selection module 330. Loan payment computation module 340 may determine the current interest rate by accessing multiple financial institution servers and querying the servers for the current interest rate of the selected mortgage at the target location. Loan payment computation module 340 may compute an average of the multiple interest rates received from the multiple financial institutions as the interest rate per period r or may select the minimum interest rate among the multiple interest rates received from the multiple financial institutions as the interest rate per period r. Loan payment computation module 340 computes the total monthly cost of the mortgage based on a sum of the payment amount per period A and the home owners insurance fees, property tax and HOA fees received from target location loan parameters module 320.

Figure 4:
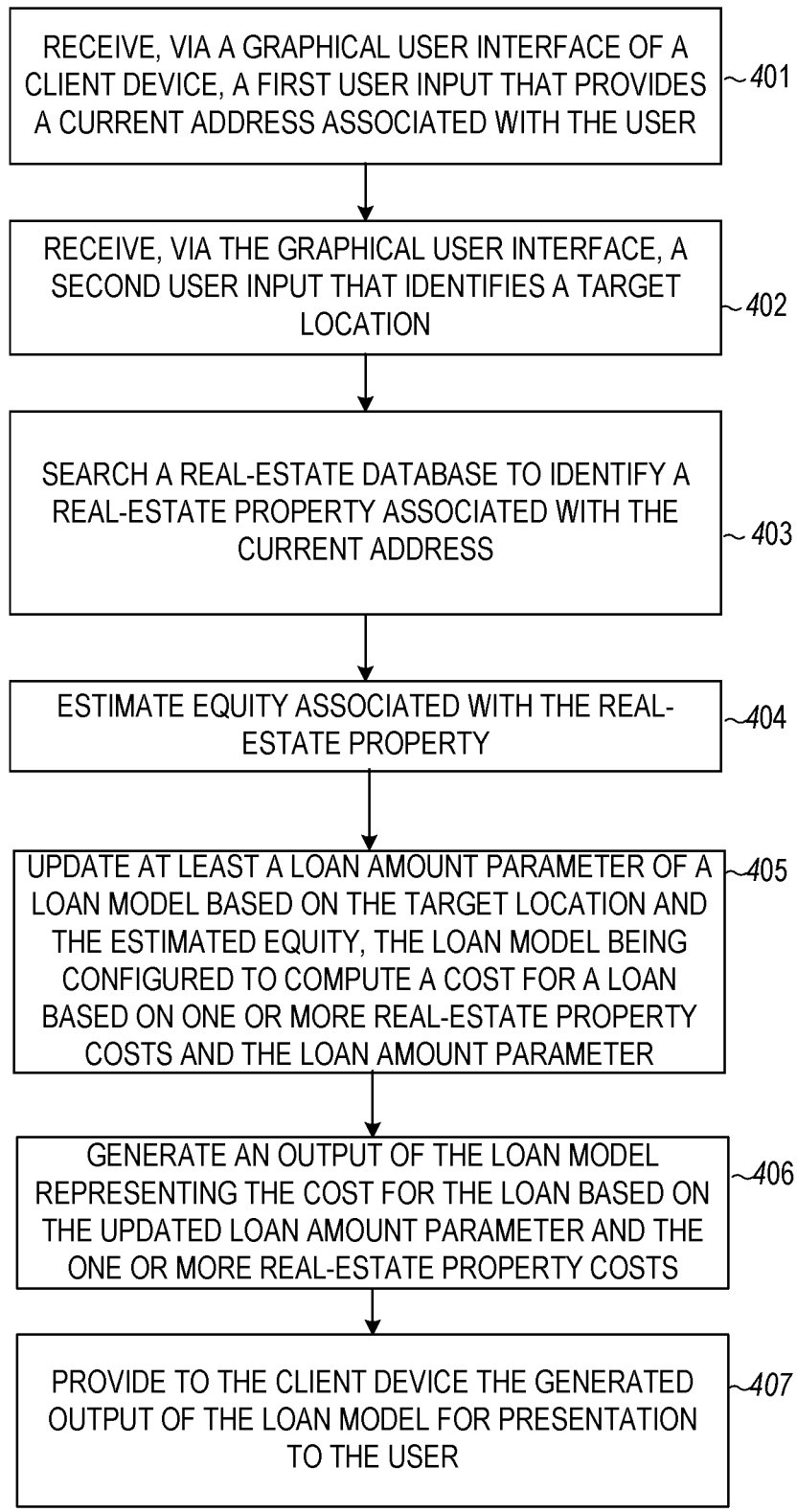
FIGS. 4-5 illustrate flow diagrams of processes for updating parameters of a loan model, according to some example embodiments.
Figure 5:
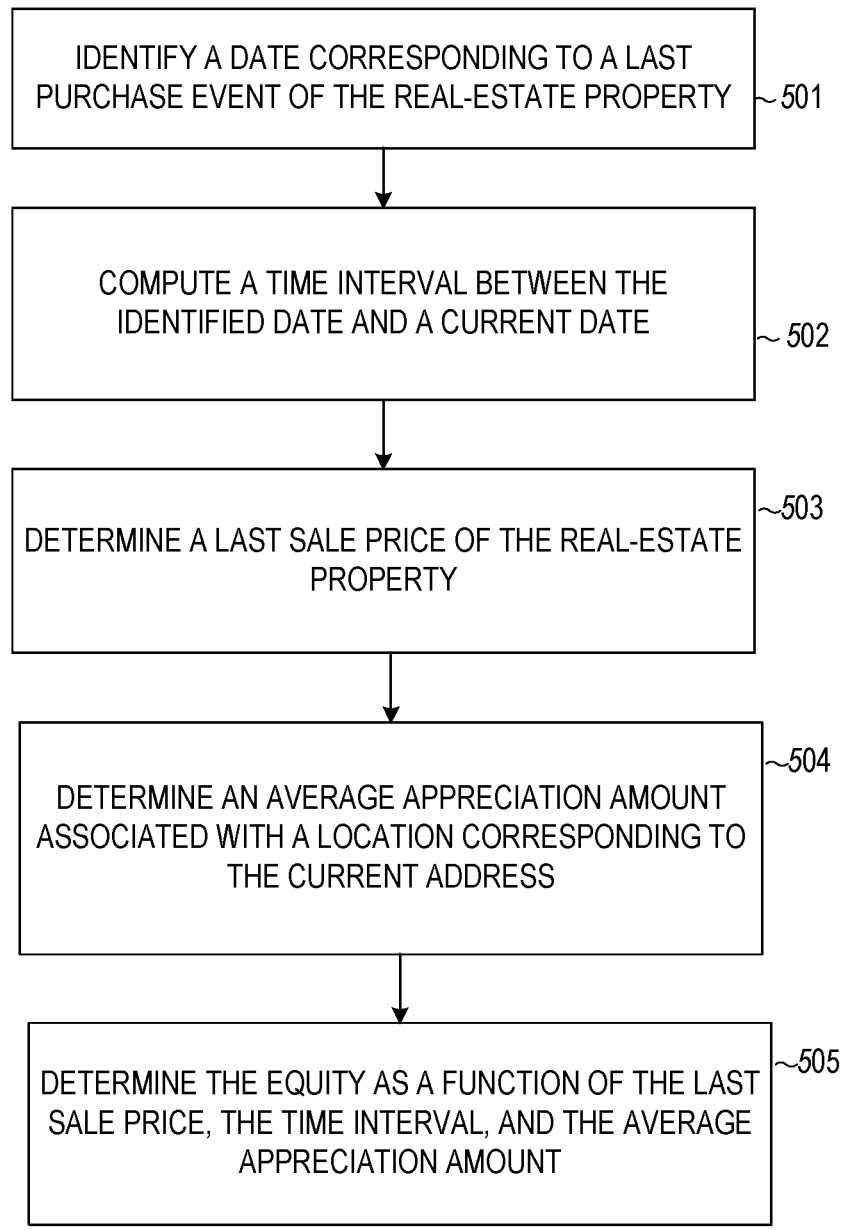

FIGS. 4-5 illustrate flow diagrams of processes 400-500 for automatically updating parameters of a loan model, according to some example embodiments. The processes 400-500 may be embodied in computer-readable instructions for execution by one or more processors such that the operations of the processes 400-500 may be performed in part or in whole by the functional components of the server system 108; accordingly, the processes 400-500 are described below by way of example with reference thereto. However, in other embodiments at least some of the operations of the processes 400-500 may be deployed on various other hardware configurations. The processes 400-500 are therefore not intended to be limited to the server system 108 and can be implemented in whole, or in part, by any other component.

Figure 6:
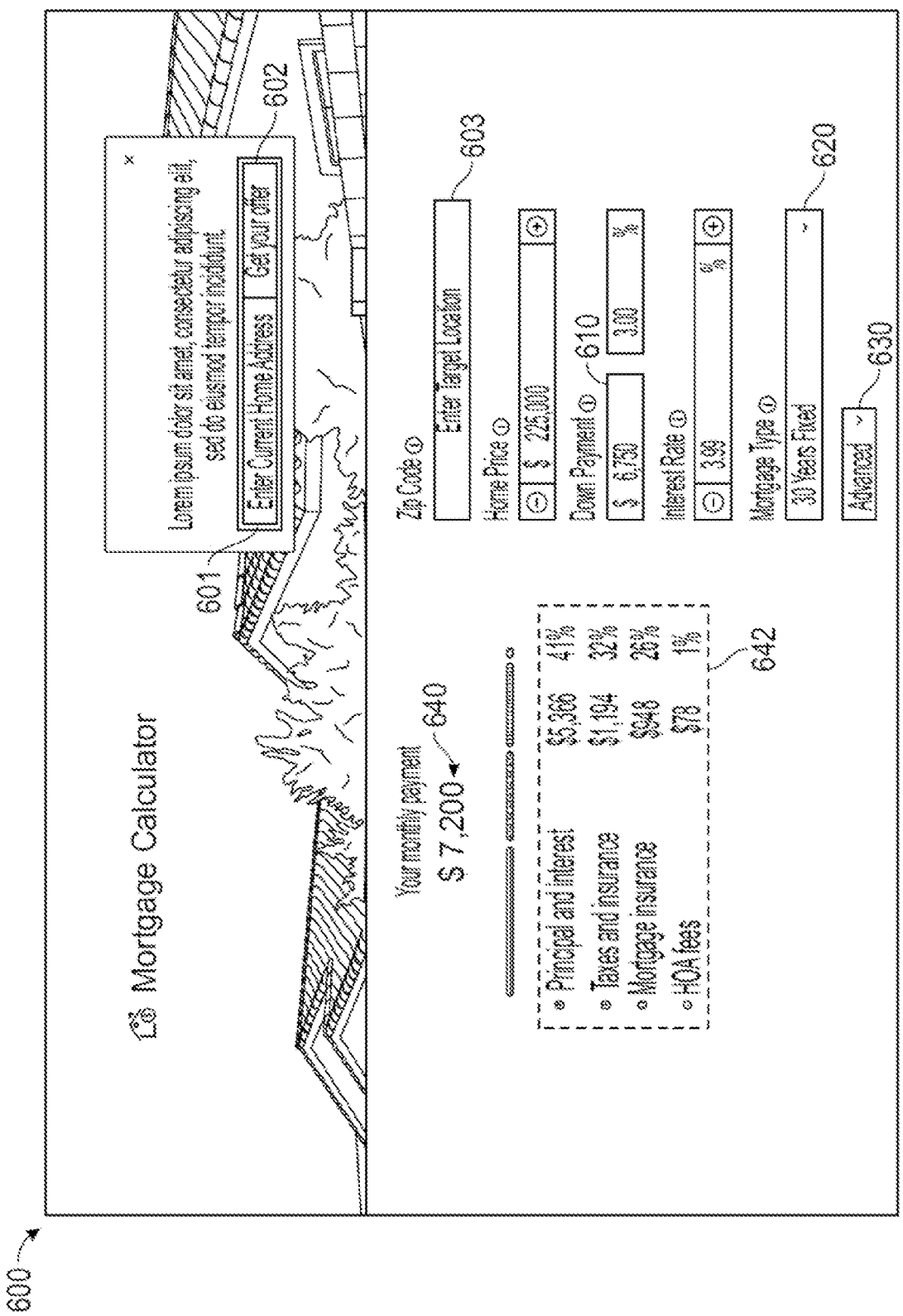

At operation 401, a computing system (e.g., server system 108) receives, via a graphical user interface, a first input that provides a current address associated with the user. For example, a client device 110 presents a graphical user interface 600 as shown in FIG. 6 (e.g., via a webpage) to a user. Client device 110 receives input from the user including a current home address in field 601 identifying the address of a real-estate property the user currently owns. This information is provided to server system 108 by client device 110. A get your offer option 602 is included in user interface 600. In some embodiments, the client device 110 provides the current address to server system 108 in response to receiving a user selection of option 602. If option 602 is selected by the user, server system 108 (as part of providing the mortgage cost for presentation as a mortgage cost parameter 640 of interface 600) also determines a value for the property at the address entered in field 601 and generates an automated offer to purchase the property at the address entered in field 601. In some embodiments, the client device 110 provides the current address in real-time as the user is typing in the address to server system 108.

At operation 402, the computing system receives, via the graphical user interface, a second input that identifies a target location. For example, the graphical user interface 600 as shown in FIG. 6 (e.g., via a webpage) is presented to the user by client device 110 and includes a target location field 603. Client device 110 receives input from the user providing the target location (e.g., a zip code, a city and state, and/or a specific address of a real-estate property) at which the user is interested in purchasing a real-estate property. This information is provided to server system 108 by client device 110.

At operation 403, the computing system searches a real-estate database to identify a real-estate property associated with the current address. For example, real-estate property value determination system 124 accesses an MLS server and retrieves information identifying a particular real-estate property associated with the address provided in field 601.

At operation 404, the computing system estimates equity associated with the real-estate property. For example, equity estimation module 230 accesses historical loan and real-estate property information associated with the real-estate property at the address entered in field 601 of FIG. 6. Based on the historical loan and property information, equity estimation module 230 estimates how much equity a user currently has in the real-estate property associated with the address entered in field 601.

In some embodiments, the computing system performs process 500 of FIG. 5 to estimate the equity associated with the real-estate property. At operation 501 of FIG. 5, the computing system identifies a date corresponding to a last purchase event of the real-estate property. For example, equity computation module 236 retrieves from historical real-estate property information storage 234 the last sale date of the real-estate property associated with the address entered in field 601 of FIG. 6.

At operation 502, the computing system computes a time interval between the identified date and a current date. For example, equity computation module 236 computes a difference between the current date and the last sale date of the real-estate property associated with the address entered in field 601 of FIG. 6.

At operation 503, the computing system determines a last sale price of the real-estate property. For example, equity computation module 236 retrieves from historical real-estate property information storage 234 the last sale price of the real-estate property associated with the address entered in field 601 of FIG. 6.

At operation 504, the computing system determines an average appreciation amount associated with a location corresponding to the current address. For example, equity computation module 236 retrieves from historical real-estate property information storage 234 the appreciation values, at the geographical location (e.g., zip code or city and state) of the real-estate property associated with the address entered in field 601 of FIG. 6 at different points in time (e.g., every year) between the present date and the last sale date of the real-estate property associated with the address entered in field 601. Equity computation module 236 computes an average of all the retrieved appreciation values.

At operation 505, the computing system determines the equity as a function of the last sale price, the time interval, and the average appreciation amount. For example, equity computation module 236 computes the equity in accordance with Equation 2, as described above. In one example, equity computation module 236 computes the equity by compounding the last sale price by the average appreciation over the time interval and may offset any mortgage associated with the real-estate property.

Returning to FIG. 4, at operation 405, the computing system updates at least a loan amount parameter of a loan model based on the target location and the estimated equity, the loan model being configured to compute a cost for a loan based on one or more real-estate property cost parameters and the loan amount parameter. For example, the loan model is a function that receives as inputs mortgage parameters (e.g., mortgage amount parameter (determined based on home price parameter and down payment amount parameters), interest rate parameter and real-estate cost parameters (e.g., property tax parameter, insurance parameter, HOA parameter, and so forth)) and outputs a monthly cost. In some implementations, the loan model computes the monthly cost for the loan in accordance with Equation 1. Specifically, the loan model computes the initial principal amount P by computing a difference between the average real-estate property values at the target location and the down payment parameter that corresponds to the estimated equity. The loan model computes the interest rate per period r based on the current interest rate of the selected mortgage (e.g., a 30 year fixed loan type). The loan model computes the total monthly cost of the mortgage based on a sum of the payment amount per period A and the home owners insurance fees, property tax and homeowners association fees parameters.

For example, loan payment computation module 340 (FIG. 3) updates the down payment parameter 610 (FIG. 6) of a selected loan product 620 based on the equity computed by equity computation module 236. In some embodiments, the server system 108 provides to the client device 110 updated parameters (e.g., down payment parameter 610, interest rate, and tax information) automatically in real-time in interface 600 as loan payment computation module 340 determines the values. Loan payment computation module 340 also updates parameters of the loan model implemented by loan payment computation module 340 associated with the target location (e.g., average real-estate property values, average tax rate, average insurance amount, average HOA fees, etc.). For example, if the selected loan product 620 is a 15-year fixed mortgage, the loan payment computation module 340 updates parameters of the loan model it implements by updating the n parameter of Equation 1 to correspond to the number of payments on a 15-year loan. Loan payment computation module 340 computes the monthly cost for the mortgage based on the updated parameters of the loan model in accordance with Equation 1, as described above. In some implementations, some loan parameters (e.g., property tax rate, insurance premiums, HOA fees, etc.) remain hidden from the user in interface 600 and are revealed and can be manipulated by the user in response to the client device 110 receiving a selection of advanced option 630.

At operation 406, the computing system generates an output of the loan model representing the cost for the loan based on the updated loan amount parameters and the one or more real-estate property cost parameters. For example, as discussed above, the loan payment computation module 340 computes a monthly loan cost based on the result of Equation 1 that provides the monthly principal and interest payment (that is based on the price of the home minus the estimated down payment determined by the estimated equity) and the addition of various monthly real-estate property costs (e.g., property tax, insurance and HOA fees).

At operation 407, the computing system provides to the client device the generated output of the loan model for presentation to the user. For example, server system 108 provides to the client device 110 mortgage cost information computed by loan payment computation module 340 for presentation in the user interface 600 (FIG. 6) as the monthly payment 640. In some implementations, the value shown as monthly payment 640 is updated in real-time automatically as the user types in and provides to the client device 110 the current home address field 601 and/or the target location field 603. A breakdown of the monthly payment 640 is provided as mortgage parameter values 642 (e.g., principal and interest, taxes and insurance, mortgage insurance, and HOA fees) which are also included in interface 600 as provided by loan payment computation module 340.

FIG. 7 is an illustrative user interface 700 for providing an output from the loan model according to some embodiments. In some embodiments, user interface 700 is presented on client device 110 in response to receiving a selection of get your offer option 602 (FIG. 6) and after the value determination module 240 completes determining a value of the real-estate property associated with the user's current address (e.g., after 24 hours). User interface 700 identifies the net proceeds that the user will end up with following a sale of the real-estate property associated with the address entered in field 601 of FIG. 6. Server system 108 generates user interface 700 based on a mortgage cost determined by loan payment computation module 340. Specifically, the loan payment computation module 340 determines how much mortgage a user likely has remaining in the real-estate property associated with the address entered in field 601 based on an estimated equity provided by equity estimation module 230 and populates mortgage payoff field 732 based on this value. Other costs associated with completing a sale of the real-estate property are included in cost region 730. User interface 700 includes an offer price 720 representing the value of the real-estate property associated with the address entered in field 601 determined by value determination module 240. The net proceeds 740 may in some cases depend on the number of days to close 710, which can be selected by the user of client device 110. In some implementations, user interface 700 provides a side-by-side comparison of different costs associated with completing the sale by accepting the automatically generated offer by value determination module 240 and completing the sale by listing the property and selling the property with a real-estate agent.

Various fields are included in interface 700. For example, an estimated days to find buyer field (not shown) is the estimated number of days the property remains on the market before it sells. In the case of accepting the automatically generated offer, this estimate is zero. The estimate of the number of days based on a sale by a real-estate agent is determined automatically by accessing an average number of days on market information for the location of the property. The average number of showings is the estimated number of times the property needs to be shown to a prospective buyer before an offer is received. The average seller concessions field is an estimate of how much cost the seller typically pays, such as inspection fees, transfer taxes, etc. The months renting field is an estimate of the time between closing the sale on the property and when the new property at the target location is purchased or when a property completes construction at the target location. The estimated rental costs field is the estimate of the monthly cost to rent out a temporary home while the new property is purchased or constructed at the target location.

Figure 8:
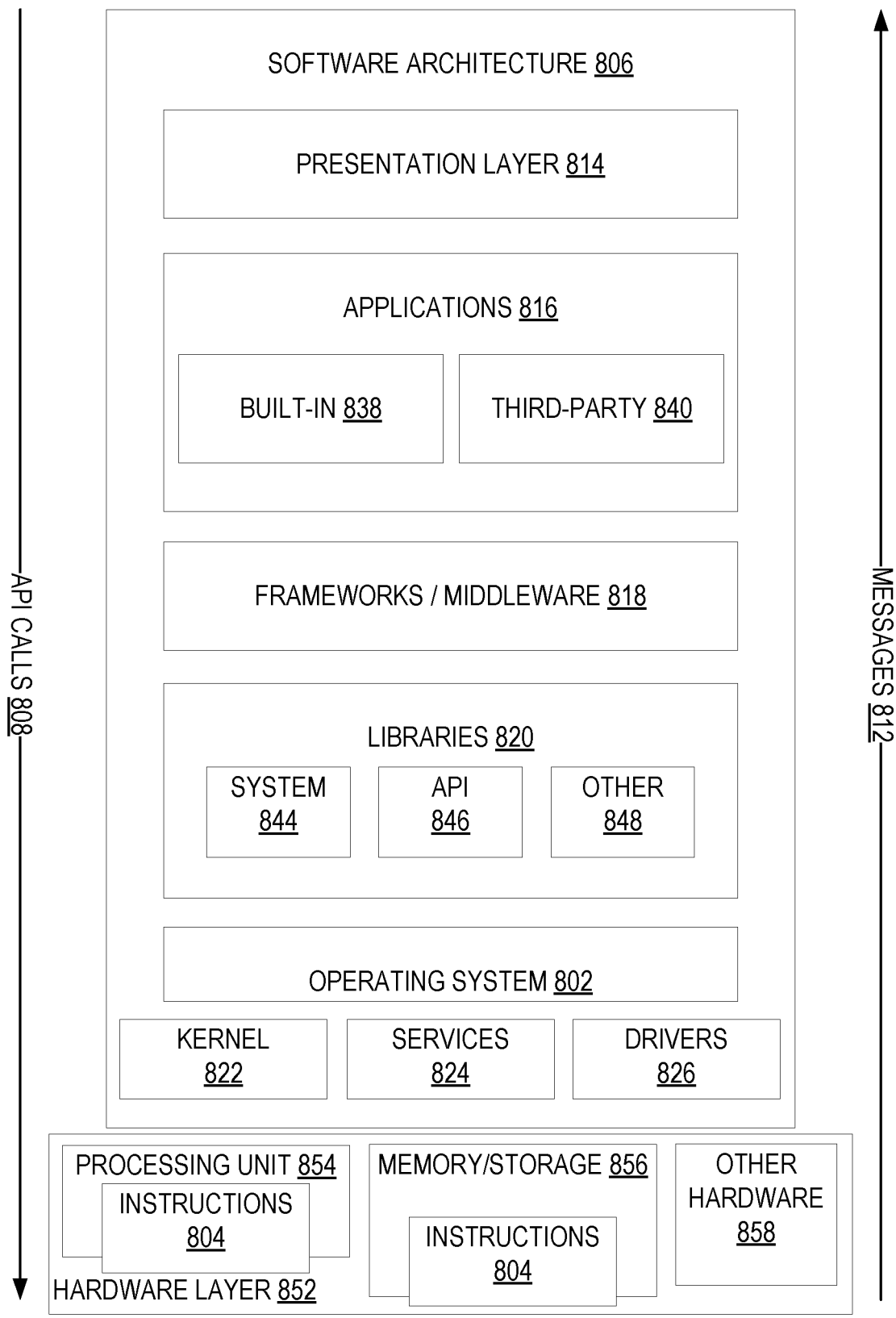
FIG. 8 is a block diagram illustrating an example of a software architecture that may be installed on a machine, according to some example embodiments.

FIG. 8 is a block diagram illustrating software architecture 806, which can be installed on any one or more of the devices described above. For example, in various embodiments, client devices 110 and servers and systems 130, 108, 120, 122, and 124 may be implemented using some or all of the elements of software architecture 806. FIG. 8 is merely a non-limiting example of a software architecture, and it will be appreciated that many other architectures can be implemented to facilitate the functionality described herein. In various embodiments, the software architecture 806 is implemented by hardware such as machine 900 of FIG. 9 that includes processors 904, memory/storage 906, and I/O components 918. In this example, the software architecture 806 can be conceptualized as a stack of layers where each layer may provide a particular functionality. For example, the software architecture 806 includes layers such as an operating system 802, a presentation layer 814, libraries 820, frameworks 818, hardware layer 852 (which includes a processing unit 854 that executes instructions 804, a memory/storage 856 that stores instructions 804, and other hardware 858), and applications 816. Operationally, the applications 816 invoke application programming interface (API) calls 808 through the software stack and receive messages 812 in response to the API calls 808, consistent with some embodiments.

In various implementations, the operating system 802 manages hardware resources and provides common services. The operating system 802 includes, for example, a kernel 822, services 824, and drivers 826. The kernel 822 acts as an abstraction layer between the hardware and the other software layers, consistent with some embodiments. For example, the kernel 822 provides memory management, processor management (e.g., scheduling), component management, networking, and security settings, among other functionality. The services 824 can provide other common services for the other software layers. The drivers 826 are responsible for controlling or interfacing with the underlying hardware, according to some embodiments. For instance, the drivers 826 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 820 provide a low-level common infrastructure utilized by the applications 816. The libraries 820 can include system libraries 844 (e.g., C standard library) that can provide functions such as memory allocation functions, string manipulation functions, mathematic functions, and the like. In addition, the libraries 820 can include API libraries 846 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 820 can also include a wide variety of other libraries 848 to provide many other APIs to the applications 816.

The frameworks 818 provide a high-level common infrastructure that can be utilized by the applications 816, according to some embodiments. For example, the frameworks 818 provide various graphic user interface (GUI) functions, high-level resource management, high-level location services, and so forth. The frameworks 818 can provide a broad spectrum of other APIs that can be utilized by the applications 816, some of which may be specific to a particular operating system 802 or platform.

In an example embodiment, the applications 816 include a home application, a contacts application, a browser application, a book reader application, a location application, a media application, a messaging application, a game application, and a broad assortment of other applications such as a third-party application 840. According to some embodiments, the applications 816 are programs that execute functions defined in the programs. Various programming languages can be employed to create one or more of the applications 816, structured in a variety of manners, such as object-oriented programming languages (e.g., Objective-C, Java, or C++) or procedural programming languages (e.g., C or assembly language). In a specific example, the third-party application 866 (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating system. In this example, the third-party application 840 can invoke the API calls 808 provided by the operating system 802 to facilitate functionality described herein.

Some embodiments may particularly include a real estate application. In certain embodiments, this may be a stand-alone application that operates to manage communications with a server system such as third-party servers 130 or server system 108. In other embodiments, this functionality may be integrated with another application. The real estate application may request and display various data related to real estate and may provide the capability for a user to input data related to the objects via a touch interface, keyboard, or using a camera device of machine 900, communication with a server system via I/O components 918, and receipt and storage of object data in memory/storage 906. Presentation of information and user inputs associated with the information may be managed by real estate application using different frameworks 818, library 820 elements, or operating system 802 elements operating on a machine 900.

Figure 9:
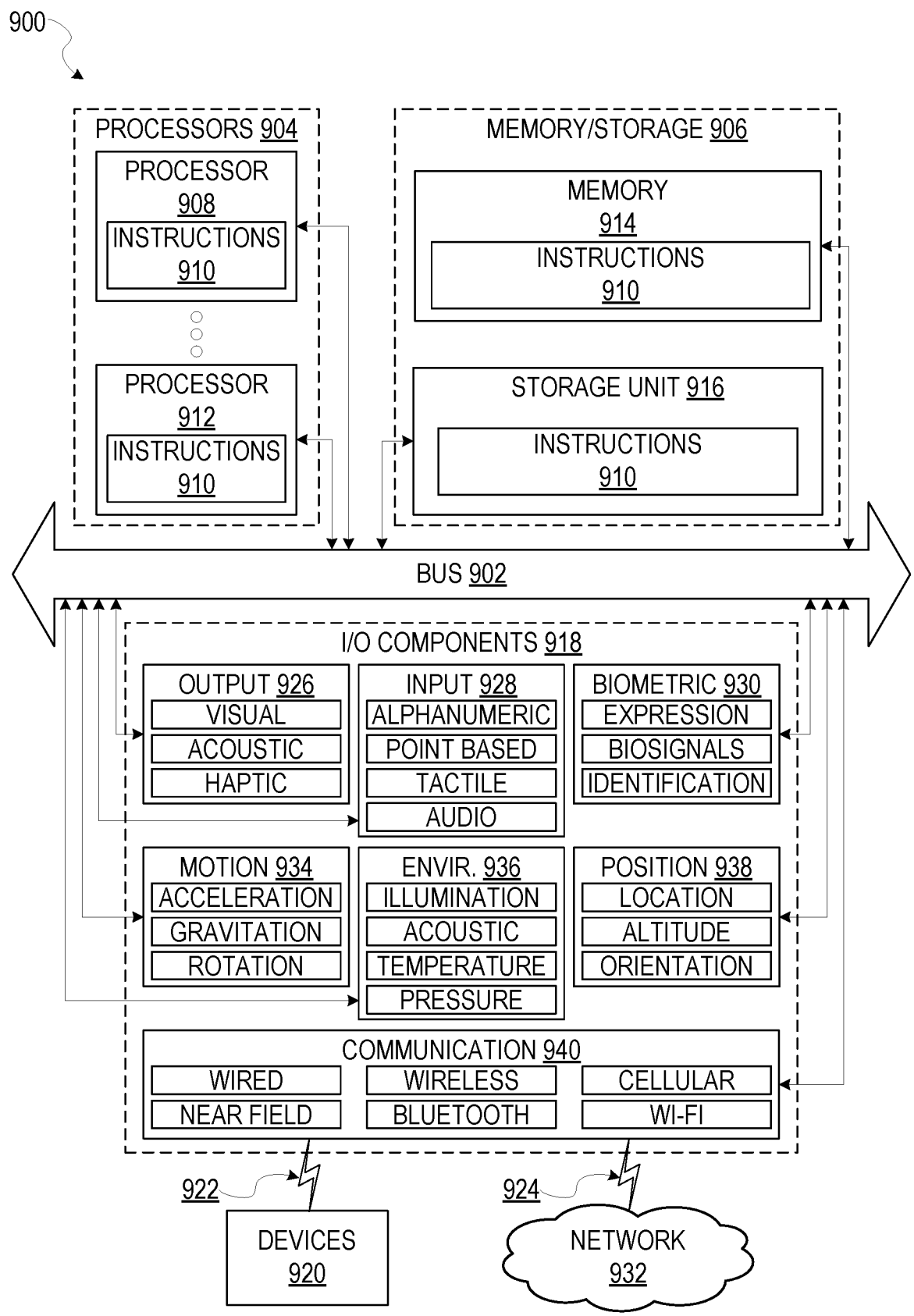
FIG. 9 illustrates a diagrammatic representation of a machine, in the form of a computer system, within which a set of instructions may be executed for causing the machine to perform any one or more of the methodologies discussed herein, according to an example embodiment.

FIG. 9 is a block diagram illustrating components of a machine 900, according to some embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 910 (e.g., software, a program, an application 816, an applet, an app, or other executable code) for causing the machine 900 to perform any one or more of the methodologies discussed herein can be executed. In alternative embodiments, the machine 900 operates as a standalone device or can be coupled (e.g., networked) to other machines. In a networked deployment, the machine 900 may operate in the capacity of a server machine 130, 108, 120, 122, 124, etc., or a client device 110 in a server-client network environment, or as a peer machine in a peer-to-peer (or distributed) network environment. The machine 900 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 910, sequentially or otherwise, that specify actions to be taken by the machine 900. Further, while only a single machine 900 is illustrated, the term "machine" shall also be taken to include a collection of machines 900 that individually or jointly execute the instructions 910 to perform any one or more of the methodologies discussed herein.

In various embodiments, the machine 900 comprises processors 904, memory 914, and I/O components 918, which can be configured to communicate with each other via a bus 902. In an example embodiment, the processors 904 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 908 and a processor 912 that may execute the instructions 910. The term "processor" is intended to include multi-core processors 904 that may comprise two or more independent processors 904 (also referred to as "cores") that can execute instructions 910 contemporaneously. Although FIG. 9 shows multiple processors 904, the machine 900 may include a single processor 904 with a single core, a single processor 904 with multiple cores (e.g., a multi-core processor 904), multiple processors 904 with a single core, multiple processors 904 with multiples cores, or any combination thereof.

The memory/storage 906 comprises a main memory 914, a static memory, and a storage unit 916 accessible to the processors 904 via the bus 902, according to some embodiments. The storage unit 916 can include a machine-readable medium on which are stored the instructions 910 embodying any one or more of the methodologies or functions described herein. The instructions 910 can also reside, completely or at least partially, within the main memory 914, within the static memory, within at least one of the processors 904 (e.g., within the processor's cache memory), or any suitable combination thereof, during execution thereof by the machine 900. Accordingly, in various embodiments, the main memory 914, the static memory, and the processors 904 are considered machine-readable media.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium is shown, in an example embodiment, to be a single medium, the term "machine-readable medium" should be taken to include a single medium or multiple media (e.g., a centralized or distributed database, or associated caches and servers) able to store the instructions 910. The term "machine-readable medium" shall also be taken to include any medium, or combination of multiple media, that is capable of storing instructions (e.g., instructions 910) for execution by a machine (e.g., machine 900), such that the instructions 910, when executed by one or more processors of the machine 900 (e.g., processors 904), cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 918 include a wide variety of components to receive input, provide output, produce output, transmit information, exchange information, capture measurements, and so on. In general, it will be appreciated that the I/O components 918 can include many other components that are not shown in FIG. 9. The I/O components 918 are grouped according to functionality merely for simplifying the following discussion, and the grouping is in no way limiting. In various example embodiments, the I/O components 918 include output components 926 and input components 928. The output components 926 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 928 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 918 include biometric components 930, motion components 934, environmental components 936, or position components 938, among a wide array of other components. For example, the biometric components 930 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 934 include acceleration sensor components (e.g., accelerometer), gravitation sensor components, rotation sensor components (e.g., gyroscope), and so forth. The environmental components 936 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 938 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 918 may include communication components 940 operable to couple the machine 900 to a network 932 or devices 920 via a coupling 924 and a coupling 922, respectively. For example, the communication components 940 include a network interface component or another suitable device to interface with the network 932. In further examples, communication components 940 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 920 may be another machine 900 or any of a wide variety of peripheral devices (e.g., a peripheral device coupled via a Universal Serial Bus (USB)).

Moreover, in some embodiments, the communication components 940 detect identifiers or include components operable to detect identifiers. For example, the communication components 940 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 940, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 932 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 932 or a portion of the network 932 may include a wireless or cellular network, and the coupling 924 may be a Code Division Multiple Access (CDMA) connection, a Global System for Mobile communications (GSM) connection, or another type of cellular or wireless coupling. In this example, the coupling 922 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 910 are transmitted or received over the network 932 using a transmission medium via a network interface device (e.g., a network interface component included in the communication components 940) and utilizing any one of a number of well-known transfer protocols (e.g., Hypertext Transfer Protocol (HTTP)). Similarly, in other example embodiments, the instructions 910 are transmitted or received using a transmission medium via the coupling 922 (e.g., a peer-to-peer coupling) to the devices 920. The term "transmission medium" shall be taken to include any intangible medium that is capable of storing, encoding, or carrying the instructions 910 for execution by the machine 900, and includes digital or analog communications signals or other intangible media to facilitate communication of such software.

Furthermore, the machine-readable medium is non-transitory (in other words, not having any transitory signals) in that it does not embody a propagating signal. However, labeling the machine-readable medium "non-transitory" should not be construed to mean that the medium is incapable of movement; the medium should be considered as being transportable from one physical location to another. Additionally, since the machine-readable medium is tangible, the medium may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
   causing display, on a client device, of a graphical user interface comprising a purchase region and a loan model region comprising representation of a loan model;
   receiving, from the client device, via the purchase region, a first input that provides a current address associated with a user, the first input being received in response to selection of an automated offer option displayed in the purchase region, the automated offer option triggering automatic computation of a current value of a real-estate property associated with the current address and generation of an offer to purchase the real-estate property associated with the current address from the user for the automatically computed current value;
   receiving, from the client device, via the loan model region, a second input that identifies a target location;
   estimating equity associated with the real-estate property based on a comparison of the automatically computed current value of the identified real-estate property with a historical value of the identified real-estate property; and
   in response to receiving the first input and the selection of the automated offer option from the purchase region of the graphical user interface:
      updating at least a loan amount parameter of the loan model based on the target location and the estimated equity, the loan model being configured to compute a cost for a loan based on one or more real-estate property costs and the loan amount parameter;
      generating an output of the loan model representing the cost for the loan based on the updated loan amount parameter and the one or more real-estate property costs; and
      providing to the client device the generated output of the loan model for presentation to the user in the loan model region.

2. The method of claim 1, wherein estimating the equity comprises estimating the current value of the real-estate property.

3. The method of claim 2 further comprising identifying a purchase event associated with the real-estate property indicating a last sale price of the real-estate property.

4. The method of claim 3, wherein the equity is based on a difference between the current value and the last sale price.

5. The method of claim 1, wherein estimating the equity comprises:
   identifying a date corresponding to a last purchase event of the real-estate property;
   computing a time interval between the identified date and a current date;
   determining a last sale price of the real-estate property;
   determining an average appreciation amount associated with a location corresponding to the current address; and
   determining the equity as a function of the last sale price, the time interval, and the average appreciation amount.

6. The method of claim 5, wherein determining the last sale price comprises:
   determining a characteristic of the real-estate property;
   determining an average value of real-estate properties associated with the characteristic on the identified date; and
   setting the last sale price based on the determined average value.

7. The method of claim 5 further comprising:
   determining an average borrowing parameter associated with the location on the identified date; and
   decrementing the determined equity based on the average borrowing parameter.

8. The method of claim 1 further comprising:
   determining at least one of an average real-estate property price for the target location, an average insurance parameter for the target location, a tax parameter for the target location, or a real-estate association parameter associated with the target location; and
   wherein updating model parameters of the loan model based on the target location comprises updating the model parameters based on the determined at least one of the average real-estate property price for the target location, the average insurance parameter for the target location, the tax parameter for the target location, or the real-estate association parameter associated with the target location.

9. The method of claim 8 further comprising accessing at least one of a database that associates tax parameters with different locations to determine the tax parameter for the target location or a database that associates insurance parameters with the different locations to determine the average insurance parameter for the target location.

10. The method of claim 1 further comprising:
    receiving a third input requesting an automated purchase offer for the real-estate property associated with the current address.

11. The method of claim 10 further comprising:
    generating a purchase offer based on the computed value; and
    transmitting a notification to the client device after the purchase offer is generated, wherein the notification includes the purchase offer and the generated output of the model.

12. The method of claim 11, wherein the notification is transmitted at least 24 hours after the third input was received.

13. The method of claim 1 further comprising receiving a third input that selects a loan model from a plurality of loan models, wherein a first of the plurality of loan models corresponds to a loan having a first length and a fixed interest amount, and wherein a second of the plurality of loan models corresponds to a loan having a second length and an adjustable interest amount.

14. The method of claim 13 further comprising generating an output of the selected loan model based on the updated loan amount parameter, the output including a monthly cost for the selected loan model.

15. The method of claim 1 further comprising:
receiving, via a graphical user interface, an adjustment to a parameter of the loan model; and
updating the loan model based on the adjusted loan model parameter.

16. A system comprising:
a memory that stores instructions; and
one or more processors configured by the instructions to perform operations comprising:
causing display, on a client device, of a graphical user interface comprising a purchase region and a loan model region comprising representation of a loan model;
receiving, from the client device, via the purchase region, a first input that provides a current address associated with a user, the first input being received in response to selection of an automated offer option displayed in the purchase region, the automated offer option triggering automatic computation of a current value of a real-estate property associated with the current address and generation of an offer to purchase the real-estate property associated with the current address from the user for the automatically computed current value;
receiving, from the client device, via the loan model region, a second input that identifies a target location;
estimating equity associated with the real-estate property based on a comparison of the automatically computed current value of the identified real-estate property with a historical value of the identified real-estate property; and
in response to receiving the first input and the selection of the automated offer option from the purchase region of the graphical user interface:
updating at least a loan amount parameter of the loan model based on the target location and the estimated equity, the loan model being configured to compute a cost for a loan based on one or more real-estate property costs and the loan amount parameter;
generating an output of the loan model representing the cost for the loan based on the updated loan amount parameter and the one or more real-estate property costs; and
providing to the client device the generated output of the loan model for presentation to the user in the loan model region.

17. The system of claim 16, wherein the operations comprising estimating the equity further comprise estimating a current value of the real-estate property.

18. The system of claim 17, wherein the operations further comprise identifying a purchase event associated with the real-estate property indicating a last sale price of the real-estate property.

19. A non-transitory computer-readable medium comprising instructions stored thereon that are executable by at least one processor to cause a computing device to perform operations comprising:
causing display, on a client device, of a graphical user interface comprising a purchase region and a loan model region comprising representation of a loan model;
receiving, from the client device, via the purchase region, a first input that provides a current address associated with a user, the first input being received in response to selection of an automated offer option displayed in the purchase region, the automated offer option triggering automatic computation of a current value of a real-estate property associated with the current address and generation of an offer to purchase the real-estate property associated with the current address from the user for the automatically computed current value;
receiving, from the client device, via the loan model region, a second input that identifies a target location;
estimating equity associated with the real-estate property based on a comparison of the automatically computed current value of the identified real-estate property with a historical value of the identified real-estate property; and
in response to receiving the first input and the selection of the automated offer option from the purchase region of the graphical user interface:
updating at least a loan amount parameter of the loan model based on the target location and the estimated equity, the loan model being configured to compute a cost for a loan based on one or more real-estate property costs and the loan amount parameter;
generating an output of the loan model representing the cost for the loan based on the updated loan amount parameter and the one or more real-estate property costs; and
providing to the client device the generated output of the loan model for presentation to the user in the loan model region.

* * * * *